US011463935B2

(12) United States Patent
Dannebro et al.

(10) Patent No.: US 11,463,935 B2
(45) Date of Patent: Oct. 4, 2022

(54) METHODS AND FUNCTIONS FOR HANDLING LOCAL BREAKOUT

(71) Applicant: Telefonaktiebolaget LM Ericsson (publ), Stockholm (SE)

(72) Inventors: Patrik Dannebro, Hisings Kärra (SE); Roland Gustafsson, Bengtsfors (SE); Antonio Iniesta Gonzalez, Madrid (ES); Angel Navas Cornejo, Leganes (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/965,073

(22) PCT Filed: Feb. 20, 2018

(86) PCT No.: PCT/EP2018/054147
§ 371 (c)(1),
(2) Date: Jul. 27, 2020

(87) PCT Pub. No.: WO2019/161883
PCT Pub. Date: Aug. 29, 2019

(65) Prior Publication Data
US 2021/0112478 A1    Apr. 15, 2021

(51) Int. Cl.
*H04W 40/02* (2009.01)
*H04L 45/00* (2022.01)
(52) U.S. Cl.
CPC ............. *H04W 40/02* (2013.01); *H04L 45/38* (2013.01)

(58) Field of Classification Search
None
See application file for complete search history.

(56) References Cited

U.S. PATENT DOCUMENTS

| | | |
|---|---|---|
| 2014/0071805 A1 | 3/2014 | Billau et al. |
| 2018/0192471 A1* | 7/2018 | Li ........................... H04W 12/06 |
| 2018/0270715 A1* | 9/2018 | Lee ..................... H04W 36/0011 |
| 2019/0254118 A1* | 8/2019 | Dao ..................... H04L 12/1407 |
| 2019/0261260 A1* | 8/2019 | Dao ....................... H04W 48/18 |
| 2020/0137675 A1* | 4/2020 | Park ....................... H04W 60/00 |
| 2020/0154390 A1* | 5/2020 | Kim ......................... H04W 8/26 |
| 2020/0178112 A1* | 6/2020 | Youn ........................ H04W 8/02 |

OTHER PUBLICATIONS

International Search Report and Written Opinion of the International Searching Authority for PCT International Application No. PCT/EP2018/054147 dated Aug. 21, 2018.

(Continued)

*Primary Examiner* — Brian S Roberts
(74) *Attorney, Agent, or Firm* — Sage Patent Group

(57) ABSTRACT

The embodiments herein relate to a method performed by a SMF, for handling local breakout of traffic. The SMF receives, from a PCF, policy information indicating traffic that should be routed via a second UPF to a second DN. The SMF provides, to a first UPF, a first traffic detection filter for detecting the traffic indicated in the received policy information. The SMF detects that there is traffic matching the first traffic detection filter. The SMF sets up, according to the policy information, a local breakout to the second UPF when the matching traffic has been detected. The setting-up comprises setting-up the second UPF.

28 Claims, 10 Drawing Sheets

OTHER PUBLICATIONS

Nokia et al., "23.501 § 5.6.7 & 5.13: Support of Groups and improvements of the support of Edge Computing," 3GPP SA WG2 Temporary Document, SA WG2 Meeting #122, Jun. 26-30, 2017, Los Cabos, Mexico, S2-175201,4 pages.

3GPP TS 23.503 V15.0.0, "3rd Generation Partnership Project; Technical Specification Group Services and System Aspects; Policy and Charging Control Framework for the 5G System; Stage 2 (Release 15)," Technical Specification, Dec. 2017, 56 pages.

3GPP TS 23.501 V15.0.0, "3rd Generation Partnership Project; Technical Specification Group Services and System Aspects; System Architecture for the 5G System; Stage 2 (Release 15)," Technical Specification, Dec. 2017, 181 pages.

3GPP TS 23.502 V15.0.0, "3rd Generation Partnership Project; Technical Specification Group Services and System Aspects; Procedures for the 5G System; Stage 2 (Release 15)," Technical Specification, Dec. 2017, 258 pages.

* cited by examiner

METHODS AND FUNCTIONS FOR HANDLING LOCAL BREAKOUT

CROSS REFERENCE TO RELATED APPLICATION

This application is a 35 U.S.C. § 371 national stage application of PCT International Application No. PCT/EP2018/054147, filed on Feb. 20, 2018, the disclosure and content of which is incorporated herein by reference in its entirety.

TECHNICAL FIELD

Embodiments herein relate generally to a Session Management Function (SMF), a method performed by the SMF, a Policy Control Function (PCF) and a method performed by the PCF. More particularly the embodiments herein relate to handling local breakout of traffic.

BACKGROUND

An example of a Fifth Generation (5G) System architecture in the non-roaming case using the service-based representation, as defined in chapter 4.2.3 of Third Generation Partnership Project (3GPP) Technical Specification (TS) 23.501 v 15.0.0, is illustrated in FIG. 1a. Service-based interfaces are used within the Control Plane. In the service-based representation, network functions within the Control Plane (CP) enables other authorized network functions to access their services. This representation also includes point-to-point reference points where necessary. A reference point representation is an alternative to the service-based representation, but will not be used herein.

As seen in FIG. 1a, the 5G system architecture comprises at least one of the following Network Functions (NF) and entities. Some of these entities will be described in more detail later.
  User Equipment (UE) 101.
  (Radio) Access Network ((R)AN) 103.
  User Plane Function (UPF) 105.
  Data Network (DN) 108, e.g. operator services, Internet access or third party services.
  Access and Mobility Management Function (AMF) 110.
  SMF 113.
  PCF 115.
  Application Function (AF) 118.
  Authentication Server Function (AUSF) 120.
  Network Slice Selection Function (NSSF) 123.
  Network Exposure Function (NEF) 125.
  NF Repository Function (NRF) 128.
  Unified Data Management (UDM) 130.
  The following service-based interfaces are illustrated in the 5G system architecture in FIG. 1a:
  Namf: Service-based interface exhibited by the AMF 110.
  Nsmf: Service-based interface exhibited by the SMF 113.
  Nnef: Service-based interface exhibited by the NEF 125.
  Npcf: Service-based interface exhibited by the PCF 115.
  Nudm: Service-based interface exhibited by the UDM 130.
  Naf: Service-based interface exhibited by the AF 118.
  Nnrf: Service-based interface exhibited by the NRF 128.
  Nnssf: Service-based interface exhibited by the NSSF 123.
  Nausf: Service-based interface exhibited by the AUSF 120.

The following reference points are also illustrated in FIG. 1a:
  N1: Reference point between the UE 101 and the AMF 110.
  N2: Reference point between the (R)AN 103 and the AMF 110.
  N3: Reference point between the (R)AN 103 and the UPF 105.
  N4: Reference point between the SMF 113 and the UPF 105.
  N6: Reference point between the UPF 105 and a DN 108.

UE 101

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

(R)AN 103

The (R)AN 103 in FIG. 1a represents an Access Network. The letter "R" between parentheses represents that the access network may be a radio access network or it may be an access network. The (R)AN 130 may comprise a base station (not illustrated in FIG. 1a). The base station may also be called gNodeB, evolved Node B (eNodeB, eNB), NodeB, B node, Radio Network Controller (RNC), Base Station Transceiver (BST), depending on the technology and terminology used. The base stations communicate over the air interface operating on radio frequencies with the UEs 101 within range of the base stations.

SMF 113

The SMF 113 includes at least one of the following functionalities:
  Session management e.g. session establishment, modify and release, etc.
  UE Internet Protocol (IP) address allocation & management.
  Address Resolution Protocol (ARP) proxying and/or IP version 6 (IPv6) Neighbour Solicitation Proxying.
  Selection and control of the UPF 105.
  Configuring of traffic steering at the UPF 105 to route traffic to proper destination.
  Termination of interfaces towards Policy control functions.
  Lawful interception.
  Charging data collection and support of charging interfaces.
  Control and coordination of charging data collection at the UPF 105.
  Termination of Session Management (SM) parts of Non-Access Stratum (NAS) messages.
  Downlink Data Notification (DDN).
  Initiator of Access Network (AN) specific SM information, sent via the AMF 110 over N2 to the AN 103.

Determining of Session and Service Continuity (SSC) mode of a session.

Roaming functionality.

Policy related functionalities.

UPF 105

The UPF 105 includes at least one of the following functionalities:

Anchor point for Intra-/Inter-Radio Access Technology (RAT) mobility.

External Packet Data Unit (PDU) Session point of interconnect to the DN 108.

Packet routing & forwarding.

Packet inspection.

User Plane part of policy rule enforcement.

Lawful intercept.

Traffic usage reporting.

Quality of Service (QoS) handling for user plane.

Uplink (UL) Traffic verification.

Transport level packet marking in the UL and downlink (DL).

DL packet buffering and downlink data notification triggering.

Sending and forwarding of one or more "end marker" to the source Next Generation-Radio Access Network (NG-RAN) node.

ARP proxying and/or IPv6 Neighbour Solicitation Proxying.

PCF 115

The PCF 115 includes at least one of the following functionalities:

Supports unified policy framework to govern network behaviour.

Policy and charging control for a service data flows;

PDU Session related policy control;

PDU Session event reporting to the AF 118.

Provides policy rules to CP function(s) to enforce them.

Accesses subscription information relevant for policy decisions in a Unified Data Repository (UDR).

AF 118

The AF 118 interacts with the 3GPP Core Network in order to provide services, for example to support the following:

Application influence on traffic routing.

Accessing Network Exposure Function.

Interacting with the Policy framework for policy control.

Local Break Out (LBO) may be described as concurrent access to two, e.g. local and central, data networks, i.e. a single PDU Session option. The term "local" refers to that some services are broken out locally, e.g. in the local UPF. The local breakout may also be described a single PDU Session with multiple PDU Session anchors. Such LBO scenario is illustrated in FIG. 1b which also uses the service-based representation as in FIG. 1a. The parts illustrated in FIG. 1b which are already described in relation to FIG. 1a will not be repeated here for the sake of simplicity. Only the differences between FIGS. 1a and 1b will now be described.

Recall that FIG. 1a illustrated one UPF 105. FIG. 1b shows two UPFs 105, i.e. a first UPF 105a and a second UPF 105b. The first UPF 105a may also be referred to as a central UPF, and the second UPF 105b may be referred to as a local UPF 105. Table 1 below provides some example names of the two UPFs 105 which may be used:

TABLE 1

| First UPF 105a | Second UPF 105b |
| --- | --- |
| Central UPF | Local UPF |
| Existing UPF | New UPF |
| Existing UPF | Added UPF |

During LBO, existing traffic which goes via the first UPF 105a to a first DN 108a may be broken out to go via the second UPF 105b to a second DN 108b. The reference point N9 illustrated in FIG. 1b is the reference point between two UPFs 105, i.e. the first and second UPFs 105a, 105b. When the reference number 105 is used without the letters A and B herein, it referrers to any of the two UPFs. Similarly, when the reference number 108 is used without the letters A and B herein, it referrers to any of the two DNs.

Note that even though FIGS. 1a and 1b illustrate one UE 101, any number of UEs 101 may be comprised in the architectures even though they are not illustrated. For example, there may be a group of UEs 101 comprising two or more UEs 101.

Support for edge computing is defined in 3GPP TS 23.501 v 15.0.0 chapter 5.13. Chapter 5.13 specifies a number of 3GPP functions that may be required, and more specifically the AF 118 influence on traffic routing.

AF influence on traffic routing is described in chapter 5.6.7 of 3GPP TS 23.501 v 15.0.0 and in chapter 4.3.6 of 3GPP TS 23.502 v 15.0.0. It describes how the AF 118 can influence selection of the UPF 105 and how the traffic shall be routed to reach an application (APP) location by using the following parameters:

Data Network Access Identifier (DNAI): Describing a location of an APP. The location of the APP may also be referred to as a data center.

N6 traffic routing information: Describing how traffic shall be routed to reach the APP.

The type of traffic: Describing a combination of a filter rule and a Data Network Name (DNN)+slice information.

The information, e.g. AF influence information, is sent from the AF 118 to the PCF 115, directly or via a NEF 125. The PCF 115 provides Policy Control and Charging (PCC) rules, e.g. with traffic steering policies including the DNAI information and type of traffic filter information, as described in clause 6.3.1 of 3GPP TS23.503 v 15.0.0, to the SMF 113.

The AF influence information can target an individual UE 101 with an ongoing session and an IP address, or a group of UEs 101 that may not even have ongoing sessions at the moment.

Group requests are stored in the PCF 115 or in a UDR, and applied to any UE session, existing or future, that matches the criteria from the AF 118 influence information. The matching criteria may be a UE subscribed group identifier or any UE 101 using a combination of e.g. DNN and slice information. At reception of PCC rules with traffic steering information provided by the PCF 115 as per AF influence request, the SMF 113 will enable a local breakout in a DN 108 matching the DNAI parameters of the traffic steering policy, for the traffic identified in the type of traffic filter information.

An AF request that target an individual UE 101 with an ongoing session and an IP address are assumed to be triggered by actual use of an APP that benefits from local breakout. But, the AF request may also be sent in advance of usage of an APP. A group request is usually sent before the UE 101 actually uses an APP that benefits from local breakout, so that the APP is already broken out locally when the usage starts.

One issue is that there is no guaranteed correlation between 1) receiving an AF influence request for a specific application and 2) with the UE 101 accessing a service that benefits from a local breakout. When the SMF 113 receives the PCC rule with steering policy information according to the request for AF influence, it will setup a distributed user plane with N6 traffic routing to an APP location, e.g. identified with DNAI, independent if the UE 101 uses the particular APP or not. This is particularly relevant for group requests, where the AF influence information is considered by the PCF 115 at session setup. The group request may be for UE's 101 that share an Internal Group ID in their subscription. The particular group ID may be used by one or many UE's 101. One problem is that, for cases where there is no traffic to break out that matches the breakout filter, the traffic is not only anchored in one UPF 105, at e.g. a central place, but also in a local UPF 105*b* according to the AF influence request. This means that all traffic for the affected UEs 101 must pass two UPFs 105 before reaching the target data network. This problem can be caused by either that the end user have not started using an application that benefits from local breakout, or have stopped using an application, but the AF influence request is still active from the AF 118. This consumes capacity in terms of use of resources at a local UPF 105*b* and complicates mobility. Additional signaling may be needed to relocate the local UPF 105*b* and the user plane path may be less optimal.

An example of how a service can benefit from local breakout would be to use the short latency. For example, augmented reality or autonomous driving or factory control such as robotics control would require extreme short latency for the user plane and need a local breakout to achieve this. Another example may be bandwidth heavy services or applications where processing is needed close to the source to not load the backhaul. Examples here could be augmented reality again, automatic surveillance image pre-processing, local cache of contents.

The issues related to processing AF requests to influence traffic routing, i.e. group request—PDU Session establishment, are illustrated in FIG. 2. The dotted arrows and boxes in FIG. 2 represent conditional steps. The method illustrated in FIG. 2 comprises at least one of the following steps, which steps may be performed in any suitable order than described below:

Step 200

The AF 118 creates an AF request message. The AF request message may be referred to as an AF influence request.

Step 201

The AF 118 sends the created AF request to the PCF 115, and the PCF 115 sends a response message back to the AF 118. The AF indicates in the AF request the traffic that has to be routed to a local access to a DN 108. The DN 108 may be identified by a DNAI. The request and response messages may be sent via the NEF 125.

The AF request message may be an Npcf_PolicyAuthorization Request message. The Npcf_PolicyAuthorization Request message may be an Npcf_PolicyAuthorization Create Request message or an Npcf_PolicyAuthorization Update Request message.

The response message may be an Npcf_PolicyAuthorization Response message. The Npcf_PolicyAuthorization Response message may be an Npcf_PolicyAuthorization Create Response message or an Npcf_PolicyAuthorization Update Response message.

Step 202

The PCF 115 may store and/or update the information from the AF request message for future PDU sessions.

Step 202 is a conditional step used for group requests as there may always come more UEs 101 matching the criteria.

Step 203

A UE 101 (not shown in FIG. 2) requests a PDU session establishment. This is illustrated in FIG. 2 by that the UE 101 sends a PDU Session Establishment request to the SMF 113. The second UPF 105*b* represents the local access in FIG. 2.

Step 204

At PDU session establishment, the SMF 113 requests the PCF 115 for PCC rules. The PCF 115 provides in the PCC rules information about the traffic that has to be routed to a local access.

The request for PCC rules may be in an Npcf_SMPolicyControl Get message sent from the SMF 113 to the PCF 115. The PCC rules information may be in an Npcf_SMPolicyControl Get Response message sent form the PCF 115 to the SMF 113.

Step 205

If indicated from the PCF 115, the SMF 113 selects a second UPF 105*b* for the traffic indicated by the PCF 115 in the PCC rule to be routed to a second access, and a first UPF 115*a* in a first location for the rest of the traffic. Using other words, the SMF 113 selects a local UPF 105*b* for the traffic indicated by the PCF 115 in the PCC rule to be routed to a local access, and a central UPF 115*a* in a central location for the rest of the traffic. This is illustrated as user plane configuration in FIG. 2. Instead of a user plane configuration, step 205 may also be a user plane reconfiguration.

Step 205 is a conditional step because there may not be a need to add local breakout, the influence could update some other parameters.

The SMF 113 installs in the second UPF 105*b* a breakout traffic filter to identify the traffic that has to be routed to the second access, i.e. the traffic that has to be routed locally which may also be referred to as locally breakout.

One problem is that, for cases where there is no traffic to break out, i.e. traffic that matches a breakout filter created by the SMF, the traffic is not only anchored in one first UPF 105*a* but also in a second UPF 105*b* according to the AF influence request. The first UPF 105*a* may be located at e.g. a central place. This means that all traffic for the affected UEs 101 must pass two UPFs 101 before reaching the target data network 108.

Therefore, there is a need to at least mitigate or solve this issue.

SUMMARY

An objective of embodiments herein is therefore to obviate at least one of the above disadvantages and to improve handling of local breakout of traffic.

According to a first aspect, the object is achieved by a method performed by a SMF for handling local breakout of traffic. The SMF receives, from a PCF, policy information indicating traffic that should be routed via a second UPF to a DN. The SMF provides, to a first UPF, a first traffic detection filter for detecting the traffic indicated in the received policy information. The SMF detects that there is traffic matching the first traffic detection filter. The SMF sets up, according to the policy information, a local breakout to the local UPF when the matching traffic has been detected. The setting-up comprises setting-up the second UPF.

According to a second aspect, the object is achieved by a method performed by a PCF for handling local breakout of traffic. The PCF receives a request from an AF. The request indicates that traffic to a second DN should be routed through a second UPF. The PCF transmits, to a SMF, policy information indicating traffic that should be routed via the second UPF to the second DN.

According to a third aspect, the object is achieved by a SMF for handling local breakout of traffic. The SMF is adapted to receive, from a PCF, policy information indicating traffic that should be routed via a second UPF to a DN. The SMF is adapted to provide, to a first UPF, a first traffic detection filter for detecting the traffic indicated in the received policy information. The SMF is further adapted to detect that there is traffic matching the first traffic detection filter. The SMF is adapted to set up, according to the policy information, a local breakout to the local UPF when the matching traffic has been detected. The setting-up comprises setting-up the second UPF.

According to a fourth aspect, the object is achieved by a PCF for handling local breakout of traffic. The PCF is adapted to receive a request from an AF. The request indicates that traffic to a second DN should be routed through a second UPF. The PCF is adapted to transmit, to a SMF, policy information indicating traffic that should be routed via the second UPF to the second DN.

When the SMF receives policy information from the PCF with information indicating traffic that should be routed via a second UPF to a second DN, the SMF does not immediately execute on establishing local breakout, but instead use a traffic detection filter rule in the first UPF. First at detection of a match in the traffic detection filter, the SMF executes a local breakout according to the earlier received policy information and breakout the traffic to the second UPF. With this, the handling of local breakout is improved.

Embodiments herein afford many advantages, of which a non-exhaustive list of examples follows:

One advantage of the embodiments herein is that they allow for AF influence to be requested without adding a local UPF for local breakout of the traffic at the same time. Instead the solution allows that local breakout is only added when there is actual use of a service that benefits of local breakout. This may be beneficial for group requests or any UE without an ongoing session, where the AF influence will be considered at PDU session setup. For such requests there will be no local breakout until a service is used.

Another advantage of the embodiments herein is that by bundling the traffic detection filter rule and the traffic steering information in the same PCC rule, minimal amount of traffic may be sent to wrong UPF. If at least one of the SMF and the UPF detect traffic, they must first report this to PCF and the PCF makes a decision to send new PCC rules to order a local breakout. During that time, the UE may continue to send traffic to the wrong UPF.

If the SMF executes a local breakout immediately at detection the amount of packets sent to wrong destination is minimal.

A further advantage of the embodiments herein is that they allow for SMF to revoke a local breakout when there is no service that benefits from using local breakout that is active. This will save capacity in terms of use of resources at a second UPF and make mobility easier.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

Figure 1A:
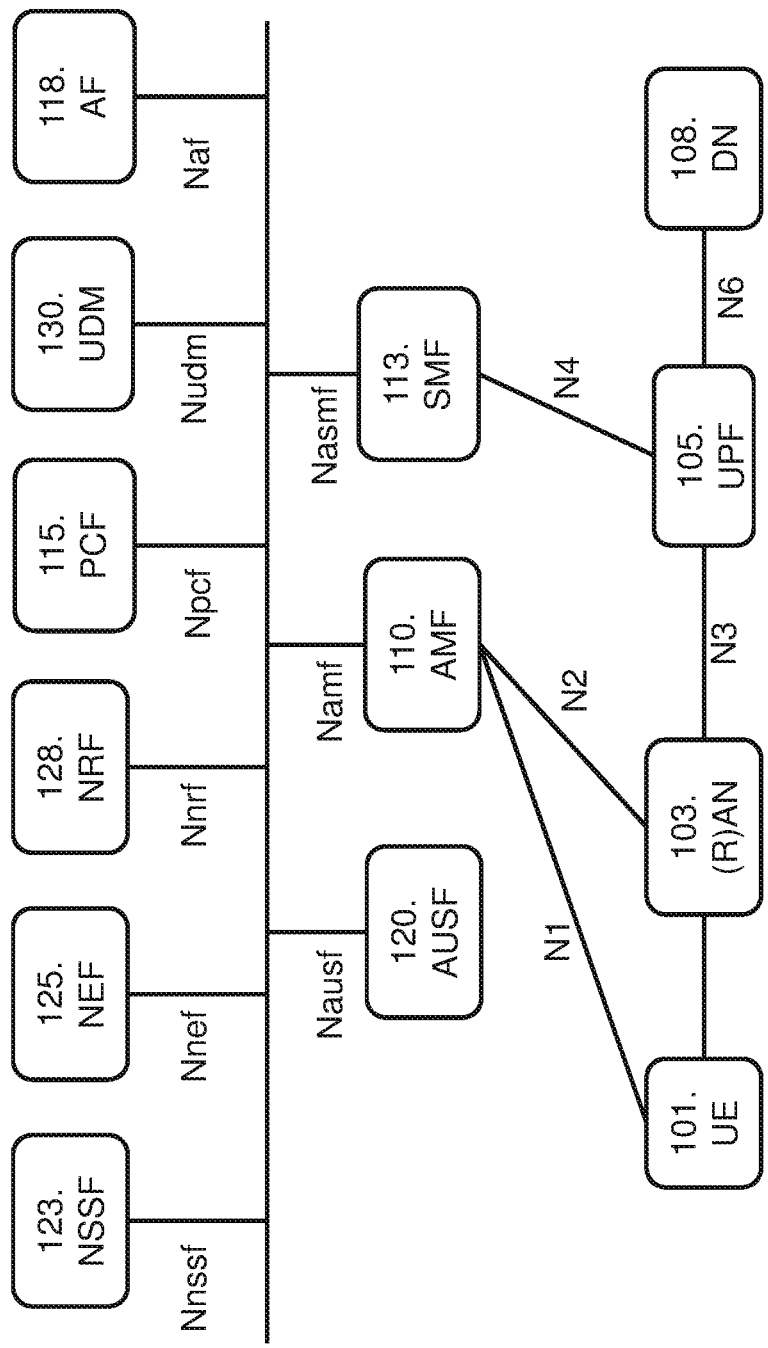
FIG. 1a is a schematic block diagram illustrating an example of a 5G system architecture in the non-roaming case using the service-based representation.
Figure 1B:
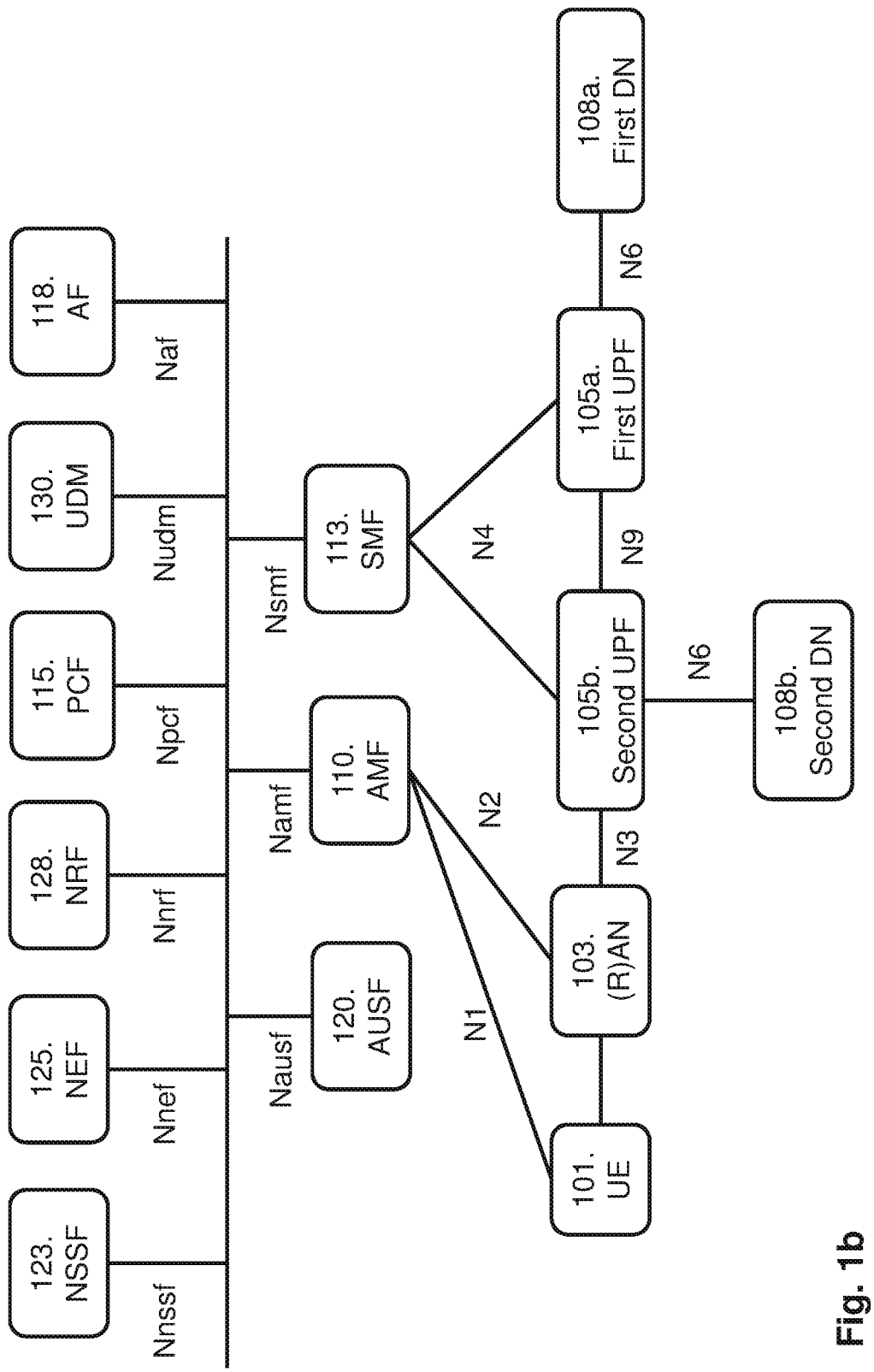
FIG. 1b is a schematic block diagram illustrating an example of a 5G system architecture in the non-roaming case using the service-based representation with local breakout.
Figure 2:
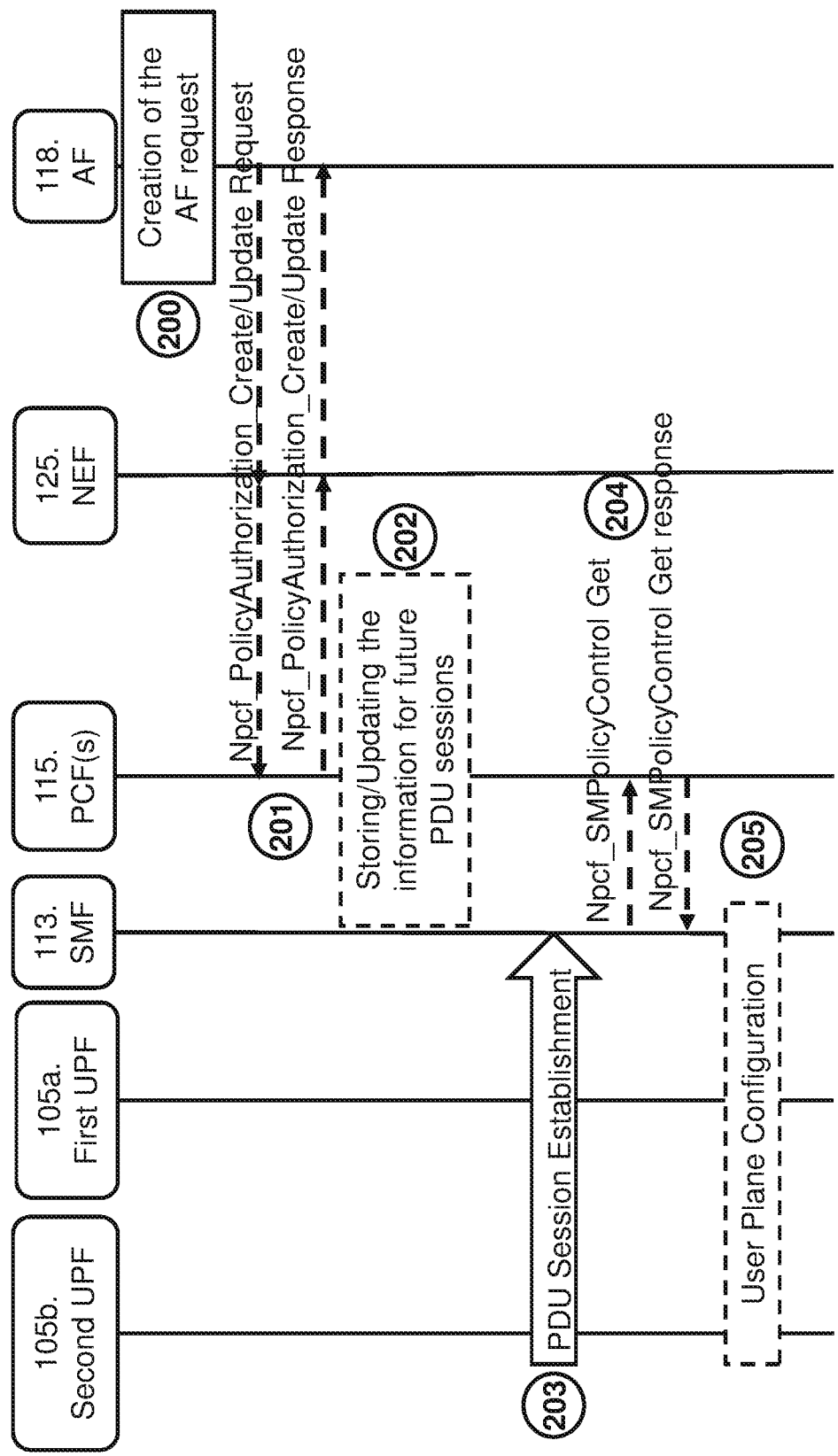
FIG. 2 is a signaling diagram illustrating a method.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein use traffic detection in combination with AF requests in order to establish or revoke local breakout based on actual end user traffic. Signaling from the PCF 115 and/or the AF 118 that traffic detection may be used for this AF request in order to establish or revoke local breakout based on actual end user traffic.

Setup Local Breakout

When the SMF 113 receives a PCC rule with traffic steering policy that contains a DNAI according to the AF influence request for establishing a local breakout the SMF 113 does not immediately execute on establishing local breakout, but instead install a traffic detection filter rule with a filter matching the AF influence request in a first UPF 105a, e.g. an existing UPF 105a.

First at detection in the traffic detection filter, i.e. a service that benefits from local breakout is used, the SMF 113 executes a local breakout according to the earlier received PCC rules with traffic steering policy and breakout the traffic to a second UPF 105b, e.g. a local UPF 105b.

The SMF 113 may make the decision to use traffic detection before executing the local breakout, or the decision to use traffic detection prior to execute local breakout can be signaled from the PCF 115 via the PCC rules with traffic steering policy or even from the AF 118, as input to the PCF 115 when building the PCC rules with traffic steering policy, as an indication in the AF influence request.

The PCF 115 could also make a decision to only send a traffic detection policy, and first when there is a match, an indication is sent by the SMF 113 to the PCF 115 with PCC rules having traffic steering policy for local breakout. However, this extra delay may lead to that additional traffic is sent via the wrong UPF 105.

Revoke Local Breakout

When the SMF 113 executes a local breakout according to a received PCC rule with traffic steering information, the SMF 113 also installs a traffic detection filter rule with filter matching the AF influence request in the newly selected second UPF 105*b*, e.g. the newly selected local UPF 105*b*.

The purpose of this traffic detection filter rule is to notify the SMF 113 if the service that benefits of local breakout is not used. If the service is not used, the SMF 113 may take a decision to revoke the local breakout.

If the end user starts using the service again, traffic detection in the first UPF 105*a* will detect usage and a local breakout can be executed again. The first UPF 105*a* may be referred to as a central UPF 105*a*.

The SMF 113 may make the decision to use traffic detection in order to revoke the local breakout, or the decision to use traffic detection in order to revoke local breakout can be signaled from the PCF 115, e.g. via the PCC rules with traffic steering policy, or even from the AF 118, e.g. as input to the PCF 115 when building the PCC rules with traffic steering policy.

The PCF 115 could also make a decision to only send a traffic detection policy, and first when there is a match indication sent to the PCF 115, PCC rules with traffic steering policy is removed to revoke local breakout.

Figure 3A:
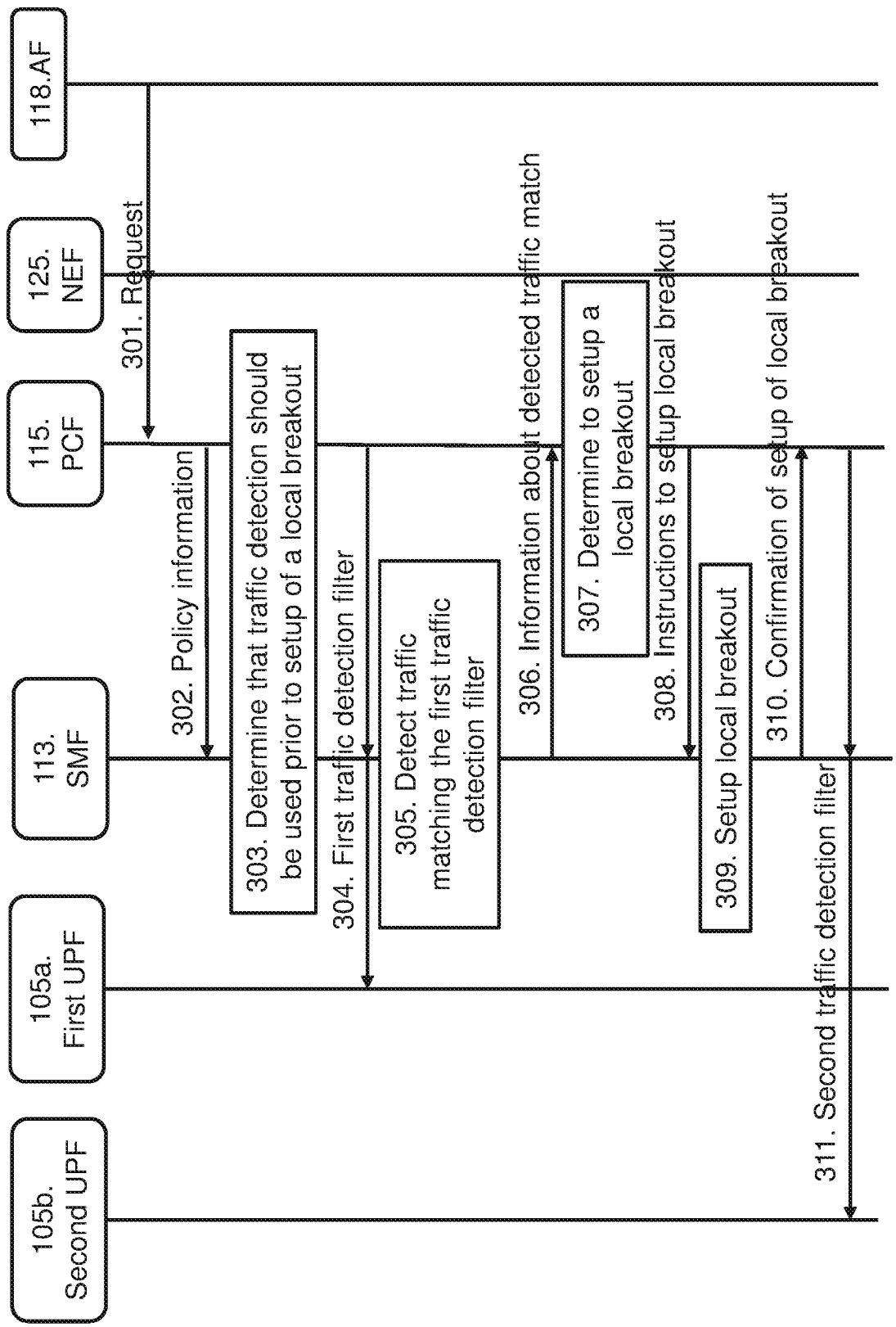
FIG. 3a, 3b are signaling diagrams illustrating a method.
Figure 3B:
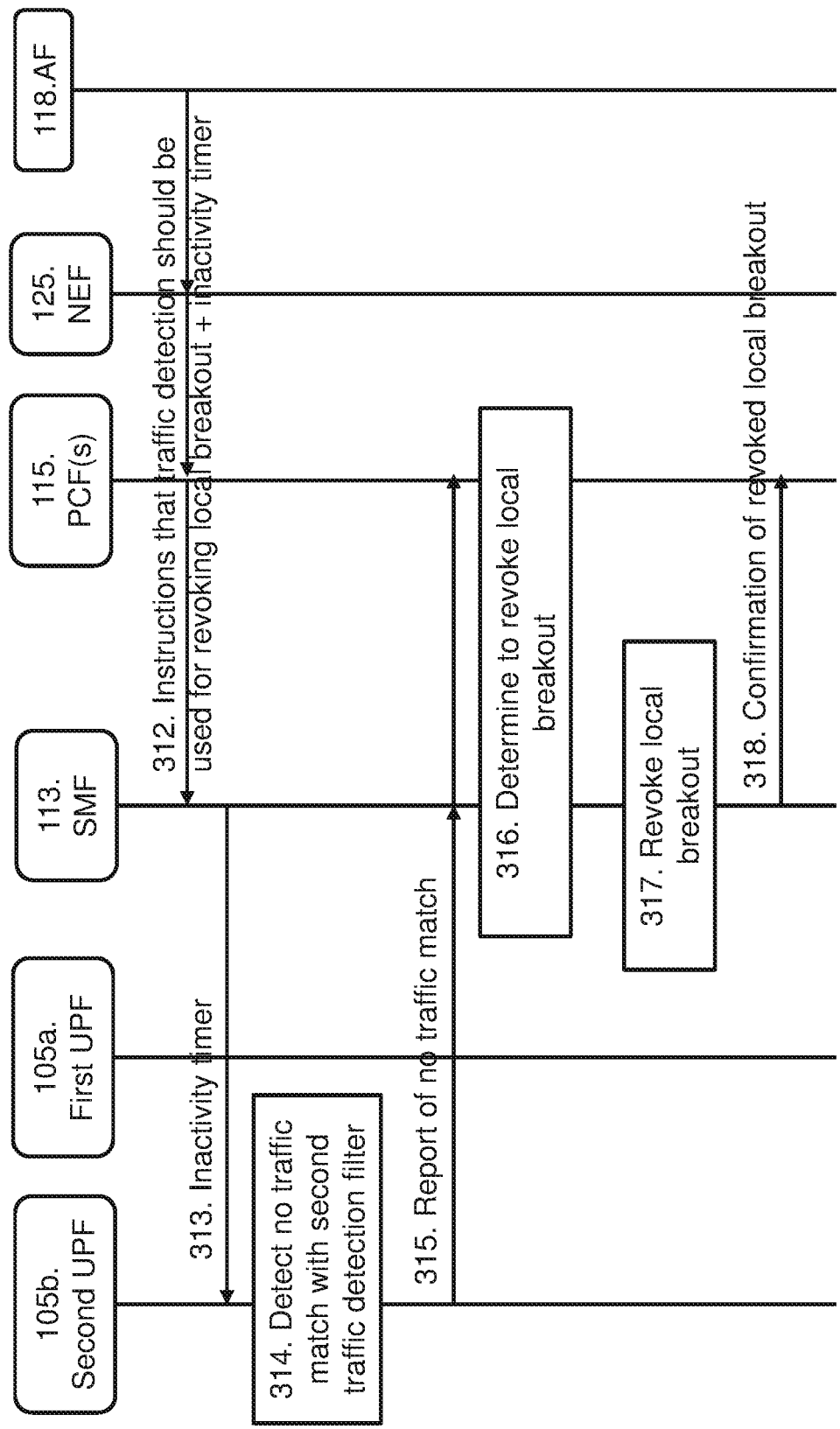

The method for handling local breakout of traffic, according to some embodiments will now be described with reference to the combined signalling diagram depicted in FIG. 3*a* and FIG. 3*b*. FIG. 3*a* comprises steps 300-311 and FIG. 3*b* comprises steps 312-318. FIG. 3*b* is to be seen as a continuation of FIG. 3*a* such that steps 300-311 are performed before steps 312-318. The method comprises at least one of the following steps, which steps may as well be carried out in another suitable order than described below.

Step 301

This step is seen in FIG. 3*a*. The AF 118 sends a request to the PCF 115. The request indicates that traffic to a second DN 108*b* should be routed through a second UPF 105*b*. The request also comprises instructions to the PCF 115 to use traffic detection. The PCF 115 receives the request from the AF 118.

The request may be sent directly to the PCF 115 or via the NEF 125. The request may be sent via the NEF 125 in the following scenarios:

If the AF 118 is not in the operator network, i.e. a 3pp AF, or

If the request is for multiple UEs 101 where the NEF interfaces multiple PCFs 115 if needed), or If the UE 101 is not identified with an IP address.

The NEF 125 can be omitted only for cases where the AF 118 is in the operator network and the request is for one UE 101 that is identified with an IP address.

An advantage of sending the request via the NEF 125 may be that it protects the operator network from 3pp requests. Certain policies and information mapping from external parameter IDs to internal IDs are done. It can also interface multiple PCFs 115 if needed for requests for multiple UEs 101, e.g. group requests.

An advantage of sending the request directly from the AF 118 to the PCF 115 without going via the NEF 125 is that there is one less network function in the network.

Step 302

This step is seen in FIG. 3*a*. The PCF 115 sends policy information to the SMF 113. The policy information indicates traffic that should be routed via a second UPF 105*b* to a second DN 108*b*.

Step 303

This step is seen in FIG. 3*a*. The SMF 113 may determine that traffic detection should be used prior to setup of a local breakout. In some embodiments, the PCF 115 takes the decision and sends instructions regarding the decision to the SMF 113 which acts accordingly. Step 303 in FIG. 3*a* and step 316 in FIG. 3*b* may be performed in on step, or they may be performed as separate steps.

Step 304

This step is seen in FIG. 3*a*. The PCF 115 may send a first traffic detection filter to the SMF 113, and the SMF 113 sends the first traffic detection filter to the first UPF 105*a*. Thus, the first detection filter may have its origin in the PCF 115 or in the SMF 113. The first UPF 105*a* receives the traffic detection filter from the SMF 113. The first traffic detection filter is for detecting traffic indicated in the received policy information from step 302.

Step 305

This step is seen in FIG. 3*a*. The SMF 113 detects traffic matching the first traffic detection filter.

The matching may be for example going to the L7 in protocol stack and matching certain messages in e.g. Hypertext Transfer Protocol (HTTP). It may also be a 5-tuple match, i.e. to check if there is a match in source and destination IP address and port and protocol for each packet. 5-tuple information may be sent from the PCF 115 to the SMF 113 and the UPF 105, but if deeper protocol levels are needed the filter may need to be preconfigured in the UPF 105 and referred to by the PCF 115 by using an identity of the filter. As an alternative to the t-tuple, an application-ID can be provided by the PCF 115 and in that case, the UPF 105 is capable of identify the traffic of such application ID based on deep packet inspection.

Step 306

This step is seen in FIG. 3*a*. The SMF 113 may send information about the detected traffic match to the PCF 115. The PCF 115 may receive the information from the SMF 113.

Step 307

This step is seen in FIG. 3*a*. The PCF 115 may determine to setup a local breakout based on the received information in step 306.

Step 308

This step is seen in FIG. 3*a*. The PCF 115 may send instructions to setup the local breakout to the SMF 113, as determined in step 307. The SMF 113 may receive the instructions from the PCF 115.

Step 309

This step is seen in FIG. 3*a*. The SMF 113 sets up the local breakout.

Step 310

This step is seen in FIG. 3*a*. The SMF 113 may send a confirmation of the setup local breakout to the PCF 115. The PCF 115 may receive the confirmation from the SMF 113.

Step 311

This step is seen in FIG. 3*a*. The PCF 113 may send a second traffic detection filter to the SMF 113. The SMF 113 may send the second traffic detection filter to the second UPF 105*b*. Thus, the second traffic detection filter may have its origin in the PCF 113 or in the SMF 113. The second traffic detection filter is to be used for revoking the local breakout. The second UPF 105*b* may receive the second traffic detection filter from the SMF 113.

In this case the second traffic detection filter shall detect that traffic detected in the initial case does not exist anymore and the second UPF 105*b* can be removed. It may also detect other traffic triggering revocation of the second UPF 105*b*.

The first and second traffic detection filters may be the same filters, but they are placed in different UPF 105 for the different purposes. When local breakout has been performed the first traffic detection filter in the first UPF 105*a* will not receive a match anymore since all the traffic that would lead to a match is now diverted to the second UPF 105*b*. Hence the second traffic detection filter for revocation must be placed in the second UPF 105*b*.

Step 312

This step is seen in FIG. 3*b*. The PCF 115 may send instructions that traffic detection should be used for revoking local breakout and an inactivity timer to the SMF 113. The SMF 113 may receive the instructions from the PCF 115. The instructions may be sent from the AF 118, possibly via the NEF 125, to the PCF 115 and further to the SMF 113.

Step 313

This step is seen in FIG. 3*b*. The SMF 113 may send the inactivity timer to the second UPF 105*b*. The second UPF 105*b* may receive the inactivity timer from the SMF 113.

Step 314

This step is seen in FIG. 3*b*. The second UPF 105*b* detects that there is no traffic matching the second traffic detection filter during a period equal to the inactivity timer.

Step 315

This step is seen in FIG. 3*b*. The second UPF 105*b* reports that there is no traffic match to the SMF 113. The SMF 113 receives the report from the second UPF 105*b*. The SMF 113 may send the report further to the PCF 115. The PCF 115 may receive the report from the SMF 13.

Step 316

This step is seen in FIG. 3*b*. The SMF 113 may determine to revoke the local breakout. Or, the PCF 115 may determine to revoke the local breakout and send instructions about the revocation to the SMF 113.

Step 317

This step is seen in FIG. 3*b*. The SMF 113 revokes the local breakout according to the decision in step 316.

Step 318

This step is seen in FIG. 3*b*. The SMF 113 may send a confirmation of the revoked local breakout to the PCF 115. The PCF 115 may receive the confirmation from the SMF 113.

The method for handling local breakout of traffic, according to some embodiments will now be described with reference to the combined signalling diagram depicted in FIG. 4. The method seen in FIG. 4 comprises at least one of the following steps, which steps may as well be carried out in another suitable order than described below.

Step 400

The AF 118 creates an AF request message. The AF request may also be referred to as an AF influence request. The term influence refers to that the AF 118 wants to influence the receiver of the request message. The AF 118 indicates in the AF influence request that for this request the SMF 113 may use traffic detection before executing local breakout and/or using traffic detection to revoke the local breakout. It may include an inactivity timer value.

Step 401

This step corresponds to steps 301 and 302 in FIG. 3*a* and step 312 in FIG. 3*b*. The AF 118 sends the created AF request to the PCF 115, and the PCF 115 sends a response message back to the AF 118. The request and response messages may be sent via the NEF 125. As mentioned above, the AF 118 indicates in the AF influence request that for this request the SMF 113 may use traffic detection before executing local breakout and/or using traffic detection to revoke the local breakout. It may include an inactivity timer value.

The AF request message may be an Npcf_PolicyAuthorization Request message. The Npcf_PolicyAuthorization Request message may be an Npcf_PolicyAuthorization Create Request message or an Npcf_PolicyAuthorization Update Request message.

The response message may be an Npcf_PolicyAuthorization Response message. The Npcf_PolicyAuthorization Response message may be an Npcf_PolicyAuthorization Create Response message or an Npcf_PolicyAuthorization Update Response message.

The AF request is for one UE 101 or a group of UEs 101 that may not even have ongoing sessions at the moment.

If the AF request is for a group of UEs 101 or for a UE 101 which does not have an ongoing IP session, the AF 118 may invoke a message from the NEF 125. The message may be referred to as Nnef_xxx. In this case, the NEF 125 may invoke the Npcf_PolicyAuthoirztion service procedure.

Step 402

The PCF 115 may store and/or updating the information from the AF request message for future PDU sessions.

Step 403

A UE 101 (not shown in FIG. 4) requests a PDU session establishment. This is illustrated in FIG. 4 by that the UE 101 sends a PDU Session Establishment request to the SMF 113. The second UPF 105*b* represents the local access in FIG. 4.

Step 404

This corresponds to step 304 in FIG. 3*a*. At PDU session establishment, the SMF 113 requests the PCF 115 for PCC rules. The PCF 115 may provide an inactivity timer value. Providing the inactivity timer in step 404 is an alternative to providing the timer in step 401.

The PCF 115 derives the PCC rules from the AF influence request. But from the SMF 113 point of view, it only executes based on PCC rules. So the SMF 113 knows that for this PCC rule request it may use traffic detection.

Step 405

This step corresponds to steps 302 and 303 in FIG. 3*a* and steps 312 and 316 in FIG. 3*b*. If not indicated from the PCF 115, the SMF 113 may take a decision that for this request use traffic detection before executing local breakout and/or use traffic detection to revoke local breakout.

If the UE match criteria for group requests, the PCF 115 will provide PCC rules with traffic steering policies to the SMF 113. If not indicated from the AF 118, the PCF 115 indicates that for this PCC rule request the SMF 113 may use traffic detection before executing local breakout and/or using traffic detection to revoke the local breakout.

Step 406*a*

This step corresponds to step 304, 305 and 306 in FIG. 3*a*. If traffic detection should be used before executing local breakout, the SMF 113 installs a traffic detection filter in the first UPF 105*a*. The first UPF 105*a* may be a central UPF 105*a*. The traffic detection filter is based on the traffic filter provided by the PCF 115 in step 405.

Step 406*b* When traffic is detected, this is signaled to the SMF 113 that decide to proceed with local breakout or to signal detection to the PCF 115.

Step 406*c*

The SMF 113 may signal the detection of traffic to the PCF 115 for example by sending an Nsmf_EventExposure Notify message to the PCF 115. The PCF 115 may receive the Nsmf_EventExposure Notify message from the SMF 113.

Step 406*d*

The PCF 115 may acknowledge to the SMF 113 the indication that the traffic has been detected by sending an Nsmf_EventExposure Notify response message to the SMF 113. The SMF 113 may receive the Nsmf_EventExposure Notify response message from the PCF 115.

Step 406*f*

The PCF 115 may provide PCC rules with traffic steering policies to the SMF 113, for example by sending an Npcf_SMPolicyControl UpdateNotify message to the SMF 113. The SMF 113 may receive the Npcf_SMPolicyControl UpdateNotify message from the PCF 115.

Step 406*g*

The SMF 113 may acknowledge the reception of the PCC rules with traffic steering policies to the PCF 115, for example by sending an Npcf_SMPolicyControl UpdateNotify response message to the PCF 115.

Step 407

This step corresponds to step 309 in FIG. 3*a*. The SMF 113 sets up the local breakout according to the received PCC rule from the PCF 115 in step 401. If using traffic detection before executing local breakout, the SMF 113 awaits step 406 to be reported. The setup of the local breakout may be referred to as user plane configuration or reconfiguration.

Step 408*a*

This step corresponds to step 311 in FIG. 3*a*. If using traffic detection to revoke local breakout, the SMF 113 installs a traffic detection filter in the second UPF 105*b* with an indication to notify the SMF 113 when there is no traffic. The SMF 113 can also provide the time that has to elapse without traffic for the second UPF 105*b* to notify the SMF 113, i.e. an inactivity timer. The second UPF 105*b* may be referred to as a local UPF 105*b*. The traffic detection filter is based on the traffic filter received in the PCC rule from the PCF 115 in step 405.

Step 408*b*

When there is no traffic match this is signaled from the second UPF 105*b* to the SMF 113.

Step 408*c*

The SMF 113 may signal the detection of no traffic match to the PCF 115 for example by sending an Nsmf_EventExposure Notify message to the PCF 115. The PCF 115 may receive the Nsmf_EventExposure Notify message from the SMF 113.

Step 408*d*

The PCF 115 may acknowledge to the SMF 113 the indication that there is no traffic match, for example by sending an Nsmf_EventExposure Notify response message to the SMF 113. The SMF 113 may receive the Nsmf_EventExposure Notify response message from the PCF 115.

Step 408*f*

The PCF 115 may provide PCC rules with traffic steering policies to the SMF 113 to revoke the local breakout. The PCC rules may be sent in an Npcf_SMPolicyControl UpdateNotify message from the PCF 115 to the SMF 113. The SMF 113 may receive the Npcf_SMPolicyControl UpdateNotify message from the PCF 115.

Step 408*g*

The SMF 113 may acknowledge the reception of the PCC rules with traffic steering policies to the PCF 115 for example by sending an Npcf_SMPolicyControl UpdateNotify response message to the PCF 115. The PCF 115 may receive the Npcf_SMPolicyControl UpdateNotify response message from the SMF 113.

Step 409

This step corresponds to step 316 and 317 in FIG. 3*b*. After receiving the signal that there is no match to the traffic filter in step 408, the SMF 113 take a decision to revoke the local breakout. The second UPF 105*b* is released and the call flow now return to step 406, waiting for traffic to be detected in order to trig local breakout. This may also be referred to as user plane configuration or reconfiguration.

Step 410*a*

The SMF 113 may send an Nsmf_EventExposure Notify message to the PCF 115. The PCF 115 may receive the Nsmf_EventExposure Notify message from the SMF 113.

Step 410*b*

The PCF 115 may send an Nsmf_EventExposure Notify response message to the SMF 113. The SMF 113 may receive the Nsmf_EventExposure Notify response message from the PCF 115.

The setup and revoke of the local breakout will now be described in more detail.

Setup of Local Breakout

When the SMF 113 receives a PCC rule with traffic steering policy including a DNAI according to the AF influence request, the SMF 113 does not immediately order a local breakout and add additional UPF(s) 105 in the traffic path. Instead, the SMF 113 will set-up a traffic detection filter in the user plane of the first UPF 105*a*, e.g. the existing UPF 105*a*. The traffic detection filter matches the parameters in the PCC rule to find the application traffic, i.e. traffic to/from an application in the UE 101. First when there is a match to this traffic detection filter, i.e. when there is traffic that shall be broken out locally, the SMF 113 will order a local breakout according to the earlier received PCC rules with traffic steering policy and add additional UPF(s) 105 in the traffic path. In one embodiment, the SMF 113 makes this decision.

In another embodiment, it is the PCF 115 that takes the decision on using traffic detection and sends down an AF influence request as either a PCC rule that shall result in local breakout immediately, i.e. no traffic detection shall be done, or in combination with an indication that only when traffic is detected shall the PCC rule be executed. The PCF 115 may receive an indication or notification when the traffic detection matches end user traffic and/or the local breakout occurs, or not, e.g. mute mode. Mute mode refers to sending an AF influence rule for local breakout that is bundled with a traffic detection rule and when PCF 115 does not expect a report when the traffic detection matches the traffic detection rule. When the PCF 115 takes the decision, it gives the PCF 115 control on for which AF influence request that traffic detection may be used and also when not using mute mode give PCF information on when a local breakout occurs.

An alternative to the PCF 115 taken the decision is that the PCF 115 only sends a traffic detection filter rule with filter matching the AF influence request. When the PCF 115 receives information from the SMF 113 that there is a match, the PCF 115 sends PCC rules with traffic steering policy for local breakout to the SMF 113.

In another alternative, the AF 118 may indicate in the original AF influence request if local breakout is only needed when the service is used. In other words, the AF 118 sends down an indication to the PCF 115 that instructs the 5GC to use traffic detection and only when there is a match the local breakout may be executed. This may be used for single or for group requests. Since the AF 118 has application knowledge it knows if an application would benefit from an immediate execution of a local breakout, and can set this indication accordingly.

Revoke Local Breakout

For the time an AF influence request is active, there may be end user traffic benefitting from local breakout only parts of the time. Revoking the local breakout when there is no end user traffic will have the same benefits as not initiating local breakout in the first place, i.e. less resource usage by not using a second UPF 105b and simplified mobility management.

Traffic detection can be used to decide when to stop local breakout. When the SMF 113 executes a local breakout, the SMF 113 also set-up a traffic detection filter rule in the user plane of the second UPF 105b. The traffic detection filter matches the parameters in the AF influence request to find the application traffic. When there is no traffic matching the traffic detection function, the second UPF 105b notifies the SMF 113 and the SMF 113 may decide to stop the local breakout.

In one example, it is the SMF 113 that makes the decision to use traffic detection to detect inactivity of a service that benefits from local breakout, and also decides on an applicable inactivity timeout.

If the end user starts the service again, traffic detection in the first UPF 105a will detect usage and a local breakout can be executed again.

Stopping local breakout does not mean that the SMF 113 reports that the AF influence request is inactive or removed, it is just the local breakout that is put on hold. If there again comes traffic that match the traffic detection in the first UPF 105a a new local breakout is executed.

In another example, it is the PCF 113 that decides if traffic detection for revoking local breakout shall be done. The PCF 113 can provide that indication to the SMF 113 including as well the value of inactivity timer for the UPF 105 to notify the SMF 113 that there is no traffic for an application.

An alternative is that PCF 115 only sends a traffic detection filter rule with filter matching the AF influence request. When the PCF 115 receives information from the SMF 113 that traffic has stopped, i.e. there is a match, the PCF 115 updated PCC rules with traffic steering policy to revoke the local breakout.

A further alternative is that it is the AF that decides if traffic detection for revoking local breakout shall be done. The AF 118 can provide that indication to the PCF 115 including as well the value of inactivity timer for the UPF 105 to notify the SMF 113 that there is no traffic for an application.

Figure 5:
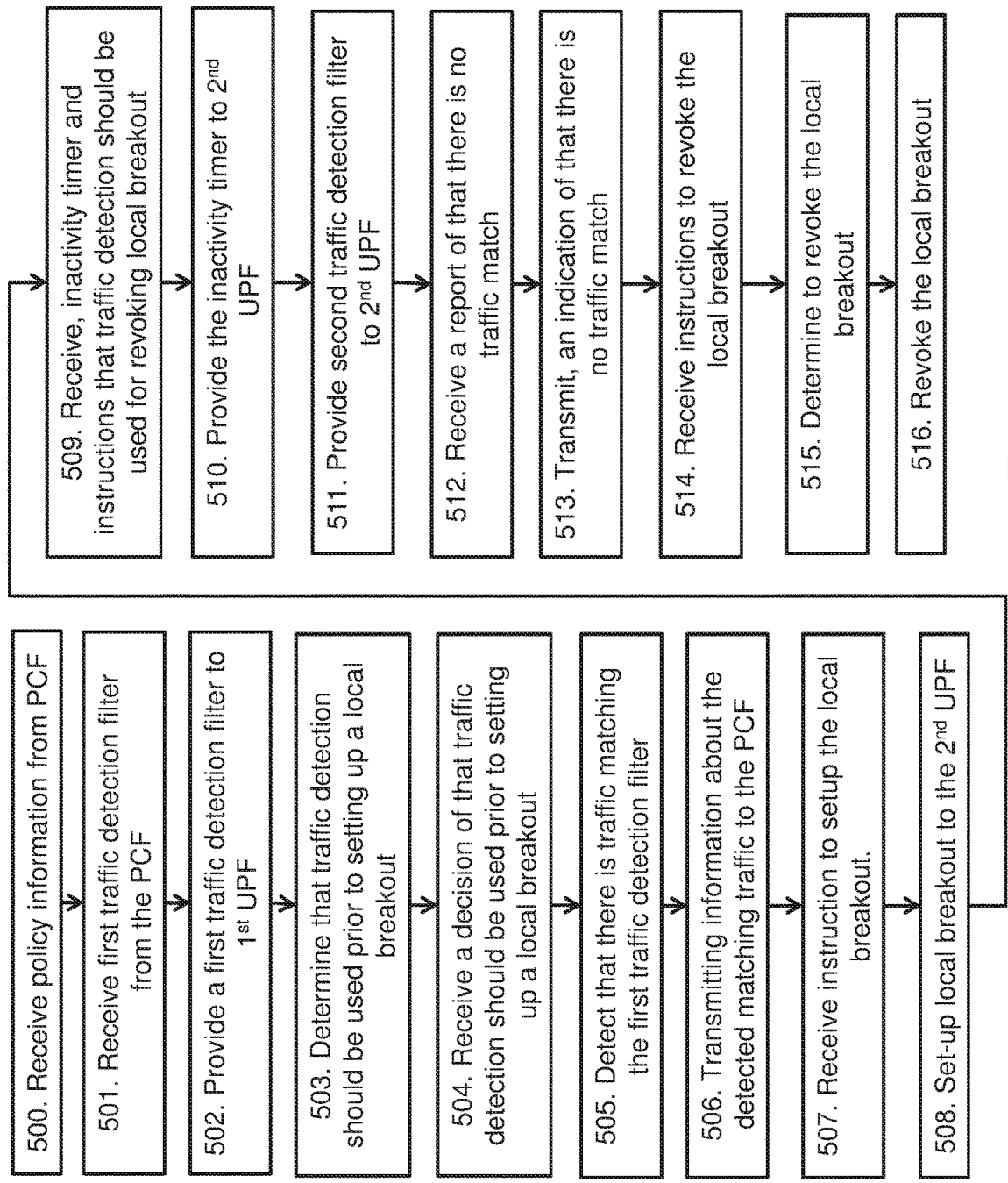
FIG. 5 is a flow chart illustrating an example method performed by the SMF.

The method described above will now be described seen from the perspective of the SMF 113. FIG. 5 is a flowchart describing the present method performed by the SMF 113 for handling local breakout of traffic. The method comprises at least one of the following steps to be performed by the SMF 113, which steps may be performed in any suitable order than described below:

Step 500

Figure 4:
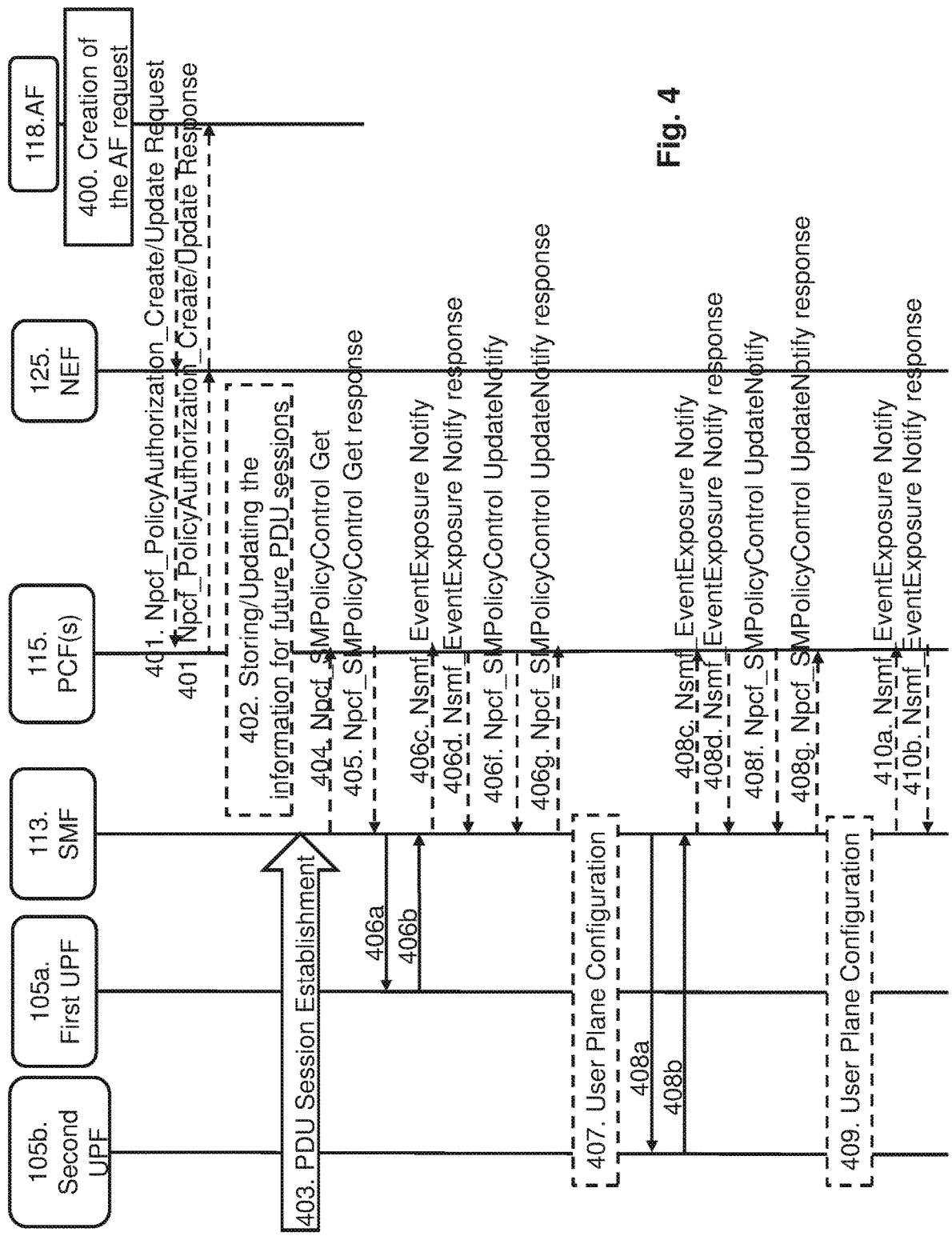
FIG. 4 is a signaling diagram illustrating a method.

This step corresponds to step 302 in FIG. 3a and step 405 in FIG. 4. The SMF 113 receives, from a PCF 115, policy information indicating traffic that should be routed via a second UPF 105b to a second DN 108b.

Step 501

This step corresponds to step 304 in FIG. 3a and step 405 in FIG. 4. The SMF 113 may receive the first traffic detection filter from the PCF 115.

Step 502

This step corresponds to step 304 in FIG. 3a and step 406a in FIG. 4. The SMF 113 provides, to a first UPF 105a, a first traffic detection filter for detecting the traffic indicated in the received policy information.

Step 503

This step corresponds to step 303 in FIG. 3a and step 405 in FIG. 4. Based on the policy information, the SMF 113 may determine that traffic detection should be used prior to setting up a local breakout.

Step 504

This step corresponds to step 302 in FIG. 3a and step 405 in FIG. 4. The SMF 113 may receive, from the PCF 115, a decision of that traffic detection should be used prior to setting up a local breakout. The decision may have been taken by the PCF 115.

Step 505

This step corresponds to step 305 in FIG. 3a and step 407 in FIG. 4. The SMF 113 detects that there is traffic matching the first traffic detection filter. The traffic matching may be detected by receiving a report of the traffic matching from the first UPF 105a.

Step 506

This step corresponds to step 306 in FIG. 3a and step 407a in FIG. 4. The SMF 113 may transmit information about the detected matching traffic to the PCF 115.

Step 504

This step corresponds to step 308 in FIG. 3a and step 407c in FIG. 4. The SMF 113 may receive instruction from the PCF 115 to setup the local breakout.

Step 508

This step corresponds to step 309 in FIG. 3a and step 407 in FIG. 4. The SMF 113 sets-up, according to the policy information, a local breakout to the second UPF 105b when the matching traffic has been detected. The setting-up comprises setting-up or the second UPF 105b. Setting up the second UPF 105b may also be referred to as adding the second UPF 105 to the communications system. The SMF 113 may send a confirmation of the setup local breakout to the PCF 115.

Step 509

This step corresponds to step 312 in FIG. 3b and step 405 in FIG. 4. The SMF 113 may receive, from the PCF 115, instructions that traffic detection should be used for revoking local breakout.

Step 510

This step corresponds to step 313 in FIG. 3b and step 408a in FIG. 4. The SMF 113 may provide the inactivity timer to the second UPF 105b. The inactivity timer may indicate when the second UPF 105b should report to the SMF 113 when there is no traffic match.

Step 511

This step corresponds to step 311 in FIG. 3a and step 408a in FIG. 4. The SMF 113 may provide a second traffic detection filter to the second UPF 105b to be used for revoking the local breakout.

Step 512

This step corresponds to step 315 in FIG. 3b and step 408b in FIG. 4. The SMF 113 may receive, from the second UPF 105b, a report of that there is no traffic match.

Step 513

This step corresponds to step 315 in FIG. 3b and step 408c in FIG. 4. The SMF 113 may transmit, to the PCF 115, an indication of that there is no traffic match.

Step 514

This step corresponds to step 316 in FIG. 3b and step 408e in FIG. 4. The SMF 113 may receive, from the PCF 115, instructions to revoke the local breakout. The instructions may be sent together with or as a part of updated policy information, i.e. policy information which is updated compared to the one from step 500.

Step 515

This step corresponds to step 316 in FIG. 3b and step 409 in FIG. 4. The SMF 113 may determine to revoke the local breakout. The decision may be taken based on the instructions from step 514. Using other words, the decision may be taken based on the updated policy information.

Step 516

This step corresponds to step 317 in FIG. 3b and step 409 in FIG. 4. The SMF 113 may revoke the local breakout based on the received report. The SMF 113 may also send a confirmation of a revoked local breakout to the PCF 115.

Figure 6:
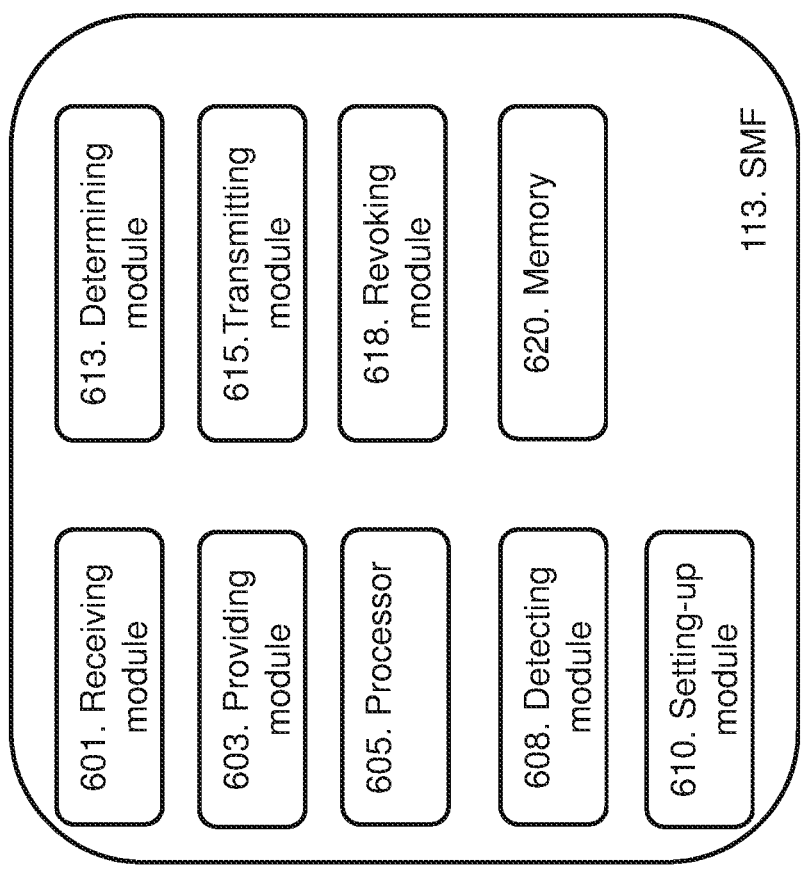
FIG. 6 is a schematic block diagram illustrating an example of a SMF.

To perform the method steps shown in FIGS. 3a, 3b, 4 and 5 for handling local breakout of traffic, the SMF 113 may comprise an arrangement as shown in FIG. 6.

The SMF 113 is adapted to, e.g. by means of a receiving module 601, receive, from a PCF 115, policy information indicating traffic that should be routed via a second 105b to a second DN 108b. The receiving module 601 may also be referred to as a receiving unit, a receiving means, a receiving circuit, means for receiving, input unit etc. The receiving module 601 may be a receiver, a transceiver etc. The receiving module 601 may be a wireless receiver of the SMF 113 of a wireless or fixed communications system.

The SMF 113 is adapted to, e.g. by means of a providing module 603, provide, to a first UPF 105a, a first traffic detection filter for detecting the traffic indicated in the received policy information. The providing module 602 may also be referred to as a providing unit, a providing means, a providing circuit, means for providing etc. The providing module 601 may be a processor 605 of the SMF 113 or comprised in the processor 605 of the SMF 113.

The SMF 113 is adapted to, e.g. by means of a detecting module 608, detect that there is traffic matching the first traffic detection filter. The traffic matching may be detected by receiving a report of the traffic matching from the first UPF 105a. The detecting module 608 may also be referred to as a detecting unit, a detecting means, a detecting circuit, means for detecting etc. The detecting module 608 may be the processor 605 of the SMF 113 or comprised in the processor 605 of the SMF 113.

The SMF 113 is adapted to, e.g. by means of a setting-up module 610, set-up, according to the policy information, a local breakout to the second UPF 105b when the matching traffic has been detected. The setting-up comprises setting-up the second UPF 105b. The setting-up module 610 may also be referred to as a setting-up unit, a setting-up means, a setting-up circuit, means for setting-up etc. The setting-up module 610 may be the processor 605 of the SMF 113 or comprised in the processor 605 of the SMF 113.

The SMF 113 may be further adapted to, e.g. by means of a determining module 613, based on the policy information, determine that traffic detection should be used prior to setting up a local breakout. The determining module 613 may also be referred to as a determining unit, a determining means, a determining circuit, means for determining etc. The determining module 613 may be the processor 605 of the SMF 113 or comprised in the processor 605 of the SMF 113.

The SMF 113 may be further adapted to, e.g. by means of the receiving module 601, receive, from the PCF 115, a decision of that traffic detection should be used prior to setting up a local breakout. The decision may have been taken by the PCF 115.

The SMF 113 may be further adapted to, e.g. by means of the receiving module 601, receive the first traffic detection filter from the PCF 115.

The SMF 113 may be further adapted to, e.g. by means of a transmitting module 615, transmit information about the detected matching traffic to the PCF 115. The transmitting module 615 may also be referred to as a transmitting unit, a transmitting means, a transmitting circuit, means for transmitting, output unit etc. The transmitting module 15 may be a transmitter, a transceiver etc. The transmitting module 615 may be a wireless transmitter of the SMF 113 of a wireless or fixed communications system.

The SMF 113 may be further adapted to, e.g. by means of the receiving module 601, receive instruction from the PCF 115 to setup the local breakout.

The SMF 113 may be further adapted to, e.g. by means of the providing module 603, provide a second traffic detection filter to the second UPF 105b to be used for revoking the local breakout.

The SMF 113 may be further adapted to, e.g. by means of the receiving module 601, receive, from the second UPF 105b, a report of that there is no traffic match.

The SMF 113 may be further adapted to, e.g. by means of a revoking module 618, revoke the local breakout based on the received notification. The revoking module 618 may also be referred to as a revoking unit, a revoking means, a revoking circuit, means for revoking etc. The revoking module 618 may be the processor 605 of the SMF 113 or comprised in the processor 605 of the SMF 113.

The SMF 113 may be further adapted to, e.g. by means of the determining module 613, determine to revoke the local breakout. The decision may be taken based on the received instructions.

The SMF 113 may be further adapted to, e.g. by means of the transmitting module 615, transmit, to the PCF 115, an indication of that there is no traffic match.

The SMF 113 may be further adapted to, e.g. by means of the receiving module 601, receive, from the PCF 115, instructions to revoke the local breakout.

The SMF 113 may be further adapted to, e.g. by means of the receiving module 601, receive, from the PCF 115, instructions that traffic detection should be used for revoking local breakout and an inactivity timer.

The SMF 113 may be further adapted to, e.g. by means of the providing module 603, provide the inactivity timer to the second UPF 105b. The inactivity timer indicates when the second UPF 105b should report to the SMF 113 when there is no traffic match.

The SMF 113 comprises the processor 605 and a memory 620. The memory 620 comprises instructions executable by the processor 605. The memory 620 is arranged to be used to store data, received data streams, power level measurements, messages, request, responses, policy information, first traffic detection filter, second traffic detection filter, decisions, information, traffic information, indications, reports, notifications, threshold values, time periods, configurations, schedulings, and applications to perform the methods herein when being executed in the SMF 113.

A first computer program may comprise instructions which, when executed on at least one processor, cause the at least one processor to carry out the method steps 500-516. A first carrier may comprise the first computer program, and the carrier is one of an electronic signal, optical signal, radio signal or computer readable storage medium.

Figure 7:
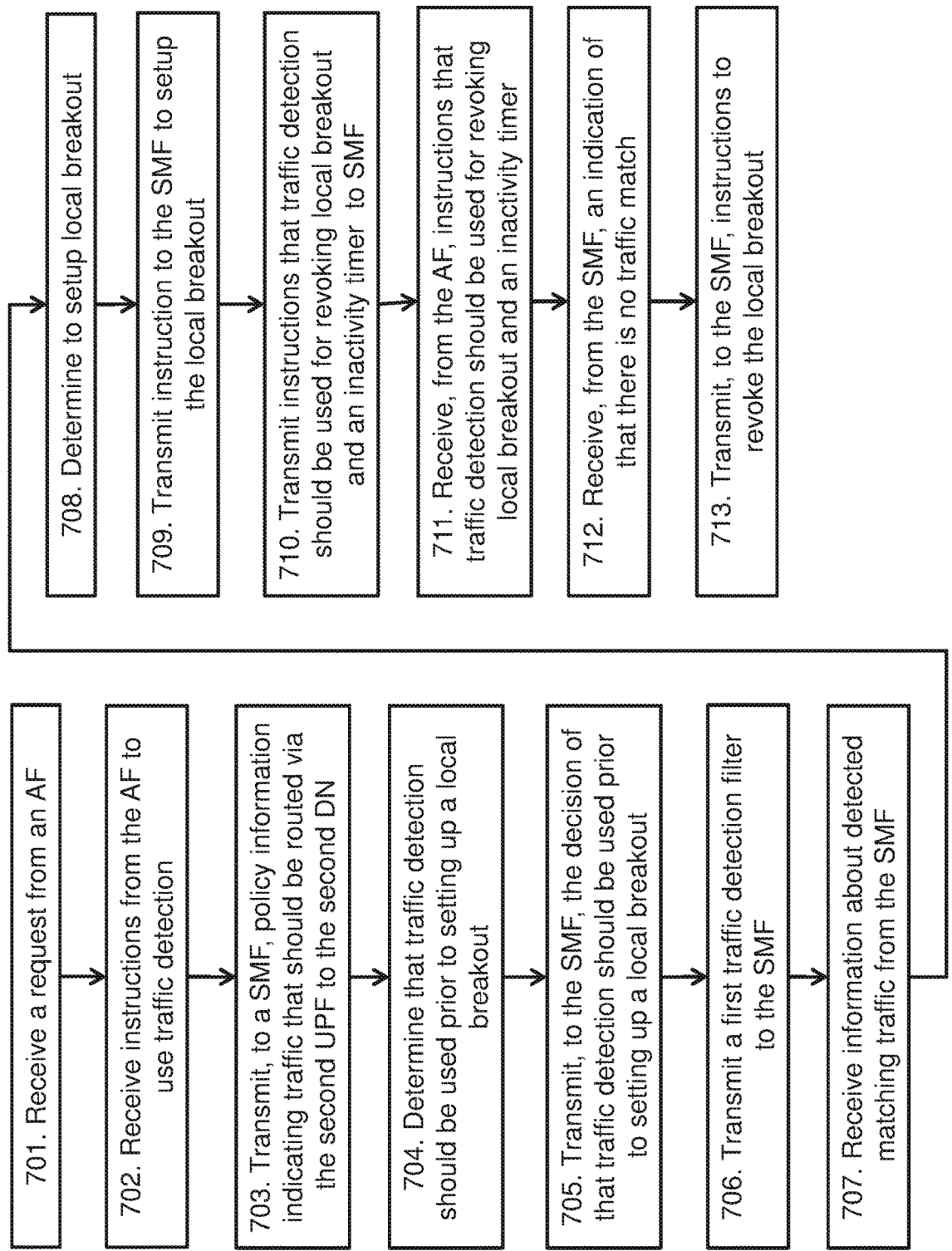
FIG. 7 is a flow chart illustrating an example method performed by the PCF.

The method described above will now be described seen from the perspective of the PCF 115. FIG. 7 is a flowchart describing the present method performed by the SMF 113 for handling local breakout of traffic. The method comprises at least one of the following steps to be performed by the PCF 115, which steps may be performed in any suitable order than described below:

Step 701

This step corresponds to step 300 in FIG. 3a and step 401 in FIG. 4. The PCF 115 receives a request from an AF 118. The request indicates that traffic to a second DN 108 should be routed through a second UPF 105b.

Step 702

This step corresponds to step 301 in FIG. 3a. The PCF 115 may receive instructions from the AF 118 to use traffic detection, and that local breakout should only be used when traffic is detected according to a traffic detection filter.

Step 703

This step corresponds to step 302 in FIG. 3a and step 405 in FIG. 4. The PCF 115 transmits, to a SMF 113, policy information indicating traffic that should be routed via the second UPF 105b to the second DN 108b.

Step 704

This step corresponds to step 303 in FIG. 3a and step 405 in FIG. 4. Based on the request from the AF 118, the PCF may determine that traffic detection should be used prior to setting up a local breakout.

Step 705

This step corresponds to step 303 in FIG. 3a and step 405 in FIG. 4. The PCF 115 may transmit, to the SMF 113, the decision of that traffic detection should be used prior to setting up a local breakout.

Step 706

This step corresponds to step 304 in FIG. 3a and step 405 in FIG. 4. The PCF 115 may transmit a first traffic detection filter to the SMF 113.

Step 707

This step corresponds to step 306 in FIG. 3a and step 406c in FIG. 4. The PCF 115 may receive information about detected matching traffic from the SMF 113.

Step 708

This step corresponds to step 307 in FIG. 3a and step 406f in FIG. 4. The PCF 115 may determine to setup local breakout.

Step 709

This step corresponds to step 308 in FIG. 3a and step 406f in FIG. 4. The PCF 115 may transmit instruction to the SMF 113 to setup the local breakout. The PCF 115 may receive a confirmation of a setup local breakout from the SMF 113.

Step 710

This step corresponds to step 312 in FIG. 3b and step 405 in FIG. 4. The PCF 115 may transmit, to the SMF 113, instructions that traffic detection should be used for revoking local breakout and an inactivity timer.

Step 711

This step corresponds to step 312 in FIG. 3. The PCF 115 may receive, from the AF 118, instructions that traffic detection should be used for revoking local breakout and an inactivity timer.

Step 712

This step corresponds to step 315 in FIG. 3b and step 408c in FIG. 4. The PCF 115 may receive, from the SMF 113, an indication of that there is no traffic match.

Step 713

This step corresponds to step 316 in FIG. 3b and step 408f in FIG. 4. The PCF 115 may transmit, to the SMF 113, instructions to revoke the local breakout. The PCF 115 may receive a confirmation of a revoked local breakout from the SMF 113.

Figure 8:
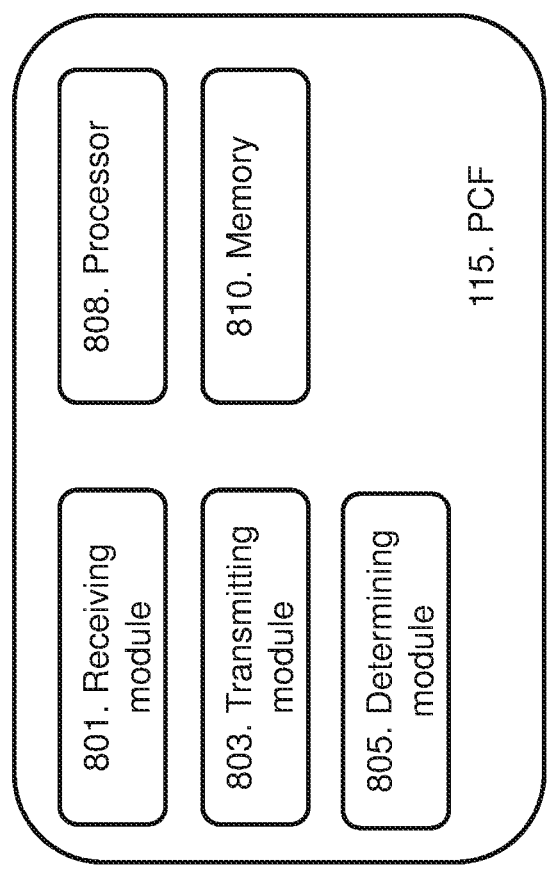
FIG. 8 is a schematic block diagram illustrating an example of a PCF.

To perform the method steps shown in FIGS. 3a, 3b, 4 and 7 for handling local breakout of traffic, the PCF 115 may comprise an arrangement as shown in FIG. 8.

The PCF 115 is adapted to, e.g. by means of a receiving module 801, receive a request from an AF 118. The request indicates that traffic to a second DN 108b should be routed through a second UPF 105b. The receiving module 801 may also be referred to as a receiving unit, a receiving means, a receiving circuit, means for receiving, input unit etc. The receiving module 801 may be a receiver, a transceiver etc. The receiving module 801 may be a wireless receiver of the PCF 115 of a wireless or fixed communications system.

The PCF 115 is adapted to, e.g. by means of a transmitting module 803, transmit, to a SMF 113, policy information indicating traffic that should be routed via the second UPF 105b to the second DN 108b. The transmitting module 803 may also be referred to as a transmitting unit, a transmitting means, a transmitting circuit, means for transmitting, output unit etc. The transmitting module 803 may be a transmitter, a transceiver etc. The transmitting module 03 may be a wireless transmitter of the PCF 115 of a wireless or fixed communications system.

The PCF 115 may be further adapted to, e.g. by means of a determining module 805, based on the request from the AF 118, determine that traffic detection should be used prior to setting up a local breakout. The determining module 805 may also be referred to as a determining unit, a determining means, a determining circuit, means for determining etc. The determining module 805 may be a processor 808 of the PCF 115 or comprised in the processor 808 of the PCF 115.

The PCF 115 may be further adapted to, e.g. by means of the transmitting module 803, transmit, to the SMF 113, the decision of that traffic detection should be used prior to setting up a local breakout.

The PCF 115 may be further adapted to, e.g. by means of the receiving module 801, receive instructions from the AF 118 to use traffic detection, and that local breakout should only be used when traffic is detected according to a traffic detection filter.

The PCF 115 may be further adapted to, e.g. by means of the transmitting module 803, transmit a first traffic detection filter to the SMF 113.

The PCF 115 may be further adapted to, e.g. by means of the receiving module 801, receive information about detected matching traffic from the SMF 113.

The PCF 115 may be further adapted to, e.g. by means of the determining module 805, determine to setup local breakout.

The PCF 115 may be further adapted to, e.g. by means of the transmitting module 803, transmit instruction to the SMF 113 to setup the local breakout.

The PCF 115 may be further adapted to, e.g. by means of the transmitting module 803, transmit, to the SMF 113, instructions that traffic detection should be used for revoking local breakout and an inactivity timer.

The PCF 115 may be further adapted to, e.g. by means of the receiving module 801, receive, from the AF 118, instructions that traffic detection should be used for revoking local breakout and an inactivity timer.

The PCF 115 may be further adapted to, e.g. by means of the receiving module 801, receive, from the SMF 113, an indication of that there is no traffic match.

The PCF 115 may be further adapted to, e.g. by means of the transmitting module 803, transmit, to the SMF 113, instructions to revoke the local breakout.

In some embodiments, the classifying node 101 comprises the processor 808 and a memory 810. The memory 810 comprises instructions executable by the processor 810. The memory 810 is arranged to be used to store data, received data streams, power level measurements, messages, request, responses, policy information, first traffic detection filter, second traffic detection filter, decisions, information, traffic information, indications, reports, notifications, threshold values, time periods, configurations, schedulings, and applications to perform the methods herein when being executed in the PCF 115.

A second computer program may comprise instructions which, when executed on at least one processor, cause the at least one processor to carry out the method steps 701-714. A second carrier may comprise the second computer program, and the second carrier is one of an electronic signal, optical signal, radio signal or computer readable storage medium.

The present mechanism for handling local breakout of traffic may be implemented through one or more processors, such as a processor 608 in the SMF arrangement depicted in FIG. 6 and a processor 808 in the PCF arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the SMF 113 and the PCF 115. One such carrier may be in the form of a CD ROM disc. It is however feasible with other data carriers such as a memory stick. The computer program code can furthermore be provided as pure program code on a server and downloaded to at least one of the SMF 113 and the PCF 115.

Some embodiments described herein may be summarised in the following manner:

A method performed by a SMF for handling local breakout of traffic. The SMF receives, from a PCF, policy information indicating traffic that should be routed via a second UPF to a DN. The SMF provides, to a first UPF, a first traffic detection filter for detecting the traffic indicated in the received policy information. The SMF detects that there is traffic matching the first traffic detection filter. The SMF sets up, according to the policy information, a local breakout to the local UPF when the matching traffic has been detected. The setting-up comprises setting-up the second UPF.

A method performed by a PCF for handling local breakout of traffic. The PCF receives a request from an AF. The request indicates that traffic to a second DN should be routed through a second UPF. The PCF transmits, to a SMF, policy information indicating traffic that should be routed via the second UPF to the second DN.

A SMF for handling local breakout of traffic. The SMF is adapted to receive, from a PCF, policy information indicating traffic that should be routed via a second UPF to a DN. The SMF is adapted to provide, to a first UPF, a first traffic detection filter for detecting the traffic indicated in the received policy information. The SMF is further adapted to detect that there is traffic matching the first traffic detection filter. The SMF is adapted to set up, according to the policy information, a local breakout to the local UPF when the matching traffic has been detected. The setting-up comprises setting-up the second UPF.

A PCF for handling local breakout of traffic. The PCF is adapted to receive a request from an AF. The request indicates that traffic to a second DN should be routed through a second UPF. The PCF is adapted to transmit, to a SMF, policy information indicating traffic that should be routed via the second UPF to the second DN.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a Session Management Function, SMF, for handling local breakout of traffic, the method comprising:
   receiving, from a Policy Control Function, PCF, policy information indicating traffic that should be routed via a second User Plane Function, UPF, to a Data Network, DN;
   providing, to a first UPF, a first traffic detection filter for detecting the traffic indicated in the received policy information;
   detecting that there is traffic matching the first traffic detection filter; and
   setting-up, according to the policy information, a local breakout to the second UPF when the matching traffic has been detected, wherein the setting-up comprises setting-up the second UPF.

2. The method according to claim 1, further comprising:
   based on the policy information, determining that traffic detection should be used prior to setting up a local breakout.

3. The method according to claim 1, further comprising:
   receiving, from the PCF, a decision of that traffic detection should be used prior to setting up a local breakout, wherein the decision has been taken by the PCF.

4. The method according to claim 1, wherein the traffic matching is detected by receiving a report of the traffic matching from the first UPF.

5. The method according to claim 1, further comprising:
   receiving the first traffic detection filter from the PCF;
   transmitting information about the detected matching traffic to the PCF; and
   receiving instruction from the PCF to setup the local breakout.

6. The method according to claim 1, further comprising:
   providing a second traffic detection filter to the second UPF to be used for revoking the local breakout;
   receiving, from the second UPF, a report of that there is no traffic match, and
   revoking the local breakout based on the received report.

7. The method according to claim 1, further comprising:
   determining to revoke the local breakout.

8. The method according to claim 7, further comprising:
transmitting, to the PCF, an indication of that there is no traffic match; and
receiving, from the PCF, instructions to revoke the local breakout; and
wherein the decision is taken based on the received instructions.

9. The method according to claim 1, further comprising:
receiving, from the PCF, instructions that traffic detection should be used for revoking local breakout.

10. The method according to claim 1, further comprising:
providing the inactivity timer to the second UPF, wherein the inactivity timer indicates when the second UPF should report to the SMF when there is no traffic match.

11. A method performed by a Policy Control Function, PCF, for handling local breakout of traffic, the method comprising:
receiving a request from an Application Function, AF, wherein the request indicates that traffic to a Data Network, DN, should be routed through a User Plane Function, UPF;
transmitting, to a Session Management Function, SMF, policy information indicating traffic that should be routed via the UPF to the DN;
determining to setup local breakout; and
transmitting instruction to the SMF to setup the local breakout.

12. The method according to claim 11, further comprising:
based on the request from the AF, determining that traffic detection should be used prior to setting up a local breakout; and
transmitting, to the SMF, the decision of that traffic detection should be used prior to setting up a local breakout.

13. The method according to claim 11, further comprising:
receiving instructions from the AF to use traffic detection, and that local breakout should only be used when traffic is detected according to a traffic detection filter.

14. The method according to claim 11, further comprising:
transmitting a first traffic detection filter to the SMF; and
receiving information about detected matching traffic from the SMF.

15. The method according to claim 11, further comprising:
transmitting, to the SMF, instructions that traffic detection should be used for revoking local breakout and an inactivity timer.

16. The method according to claim 11, further comprising:
receiving, from the AF, instructions that traffic detection should be used for revoking local breakout and an inactivity timer.

17. The method according to claim 11, further comprising:
receiving, from the SMF, an indication of that there is no traffic match; and
transmitting, to the SMF, instructions to revoke the local breakout.

18. A Session Management Function, SMF, for handling local breakout of traffic, comprising:
at least one processor; and
at least one memory coupled with the at least one processor, wherein the at least one memory stores instructions executable by the at least one processor to:
receive, from a Policy Control Function, PCF, policy information indicating traffic that should be routed via a second User Plane Function, UPF, to a Data Network, DN;
provide, to a first UPF, a first traffic detection filter for detecting the traffic indicated in the received policy information;
detect that there is traffic matching the first traffic detection filter; and to
set-up, according to the policy information, a local breakout to the second UPF when the matching traffic has been detected, wherein the setting-up comprises setting-up the second UPF.

19. The SMF according to claim 18, being further adapted to:
based on the policy information, determine that traffic detection should be used prior to setting up a local breakout.

20. The SMF according to claim 18, being further adapted to:
receive, from the PCF, a decision of that traffic detection should be used prior to setting up a local breakout, wherein the decision has been taken by the PCF.

21. The SMF according to claim 18, wherein the traffic matching is detected by receiving a report of the traffic matching from the first UPF.

22. The SMF according to claim 18, being further adapted to:
receive the first traffic detection filter from the PCF;
transmit information about the detected matching traffic to the PCF; and to
receive instruction from the PCF to setup the local breakout.

23. The SMF according to claim 18, being further adapted to:
provide a second traffic detection filter to the second UPF to be used for revoking the local breakout;
receive, from the second UPF, a report of that there is no traffic match, and to
revoke the local breakout based on the received notification.

24. The SMF according to claim 18, being further adapted to:
determine to revoke the local breakout.

25. The SMF according to claim 24, being further adapted to:
transmit, to the PCF, an indication of that there is no traffic match; and
receive, from the PCF, instructions to revoke the local breakout; and
wherein the decision is taken based on the received instructions.

26. The SMF according to claim 18, being further adapted to:
receive, from the PCF, instructions that traffic detection should be used for revoking local breakout and an inactivity timer.

27. The SMF according to claim 18, being further adapted to:
provide the inactivity timer to the second UPF, wherein the inactivity timer indicates when the second UPF should report to the SMF when there is no traffic match.

28. A Policy Control Function, PCF, for handling local breakout of traffic, comprising:
   at least one processor; and
   at least one memory coupled with the at least one processor, wherein the at least one memory stores instructions executable by the at least one processor to:
   receive a request from an Application Function, AF, wherein the request indicates that traffic to a Data Network, DN, should be routed through a User Plane Function, UPF;
   transmit, to a Session Management Function, SMF, policy information indicating traffic that should be routed via the UPF to the DN;
   determining to setup local breakout; and to
   transmitting instruction to the SMF to setup the local breakout.

* * * * *